United States Patent
Cao et al.

(10) Patent No.: US 10,387,181 B2
(45) Date of Patent: Aug. 20, 2019

(54) PRE-DEPLOYMENT OF PARTICULAR VIRTUAL MACHINES BASED ON PERFORMANCE AND DUE TO SERVICE POPULARITY AND RESOURCE COST SCORES IN A CLOUD ENVIRONMENT

(71) Applicant: INTERNATIONAL BUSINESS MACHINES CORPORATION, Armonk, NY (US)

(72) Inventors: Bin Cao, Stanford, CA (US); David M. Egle, Rochester, MN (US); Daniel L. Hiebert, Pine Island, MN (US); Cory J. Kleinheksel, Ames, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 14/993,289

(22) Filed: Jan. 12, 2016

(65) Prior Publication Data
US 2017/0199752 A1    Jul. 13, 2017

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01);
(Continued)

(58) Field of Classification Search
CPC ............... G06F 9/45558; G06F 9/5077; G06F 2009/45591; G06F 2009/4557; G06F 2009/45575; G06F 2009/45595
See application file for complete search history.

(56) References Cited

U.S. PATENT DOCUMENTS 6,117,187 A    9/2000  Staelin
8,095,929 B1 *  1/2012  Ji .......................... G06F 9/4856
                                                  709/223
(Continued)

FOREIGN PATENT DOCUMENTS

CN        102739798       10/2012

OTHER PUBLICATIONS

Warneke et al., "Exploiting Dynamic Resource Allocation for Efficient Parallel Data Processing in the Cloud", IEEE Transactions on Parallel and Distributed Systems, vol. 22, No. 6, Jun. 2011, pp. 985-997.
(Continued)

*Primary Examiner* — James J Lee
*Assistant Examiner* — Michael W Ayers
(74) *Attorney, Agent, or Firm* — William Hartwell; Andrew D. Wright; Roberts Mlotkowski Safran Cole & Calderon, P.C.

(57) ABSTRACT

A computer-implemented method includes: monitoring, by a computing device, performance of currently deployed virtual machines (VMs) that implement particular services; determining, by the computing device, optimal configuration options for deployment of new VMs that implement one or more of the particular services based on the monitoring the performance of the currently deployed VMs; and outputting, by the computing device, information regarding the optimal configuration options to a user requesting the deployment of a new VM implementing one or more of the particular services.

18 Claims, 8 Drawing Sheets

(52) U.S. Cl.
CPC .............. *G06F 2009/45575* (2013.01); *G06F 2009/45591* (2013.01); *G06F 2009/45595* (2013.01)

(56) References Cited

U.S. PATENT DOCUMENTS

| | | | | |
|---|---|---|---|---|
| 8,434,081 | B2* | 4/2013 | Cervantes | G06F 9/45558 709/226 |
| 8,595,722 | B2 | 11/2013 | Gupta et al. | |
| 8,839,221 | B2 | 9/2014 | Sapuntzakis et al. | |
| 8,839,234 | B1 | 9/2014 | Voronkov et al. | |
| 8,874,749 | B1 | 10/2014 | Vittal et al. | |
| 9,037,689 | B2 | 5/2015 | Khandekar et al. | |
| 9,244,705 | B1* | 1/2016 | Bondalapati | G06F 9/45504 |
| 2010/0198973 | A1* | 8/2010 | Jung | G06F 9/45533 709/226 |
| 2010/0306774 | A1* | 12/2010 | Kalbarga | G06F 9/441 718/1 |
| 2011/0029970 | A1* | 2/2011 | Arasaratnam | G06F 9/45558 718/1 |
| 2012/0167083 | A1* | 6/2012 | Suit | G06F 11/0712 718/1 |
| 2012/0180045 | A1* | 7/2012 | Bhogal | G06F 9/50 718/1 |
| 2014/0280946 | A1 | 9/2014 | Mukherjee et al. | |
| 2014/0282520 | A1* | 9/2014 | Sabharwal | G06F 9/455 718/1 |
| 2015/0286494 | A1* | 10/2015 | Yan | G06F 9/45558 718/1 |

OTHER PUBLICATIONS

Pumma et al., "Automatic VM Allocation for Scientific Application", IEEE 18th International Conference on PArallel and Distributed Systems, 2012; 6 Pages.

Omara et al., "Optimum Resource Allocation of Database in Cloud Computing", Egyptian Informatics Journal, vol. 15, 2014; 12 Pages.

Xiao et al., "Dynamic Resource Allocation Using Virtual Machines for Cloud Computing Environment", EEE Transactions on Parallel and Distributed Systems, vol. 24, No. 6, 2013; 11 Pages.

Yang et al., "A Dynamic Resource Allocation Model for Virtual Machine Management on Cloud", Springer-Verlag Berlin Heidelberg, 2001; 10 Pages.

Jackson, Virtual Machines Need Regular Defragging, Researcher Says, ComputerWorld, http://www.computerworld.com/article/2516000/enterprise-applicationsivirtual-machines-need-regular-defragging-researcher-says.html, Sep. 24, 2010; 3 Pages.

VMWare Workstation 5.0, "Deframenting Virtual Disks", https://www.vmware.com/support/ws5/doc/ws_disk_defrag.html, 2015; 2 Pages.

Li et al., "Efficient Multi-Tenant Virtual Machine Allocation in Cloud Data Centers", Tsinghua Science and Technology, vol. 20, No. 1, Feb. 2015; 9 Pages.

Dutreilh et al., "Using Reinforcement Learning for Autonomic Resource Allocation in Clouds: Towards a Fully Automated Workflow", ICAS 2011 : The Seventh International Conference on Autonomic and Autonomous Systems, 2001, pp. 67-74.

Mell et al., "The NIST Definition of Cloud Computing", NIST, Special Publication 800-145, Sep. 2011, 7 pages.

List of IBM Patents or Patent Applications Treated as Related, dated Jun. 5, 2019, 1 page.

Specification "Optimizing the Deployment of Virtual Resources and Automating Post-Deployment Actions in a Cloud Environment" and Drawings in U.S. Appl. No. 16/427,429, filed May 31, 2019, 51 pages.

Specification "Optimizing the Deployment of Virtual Resources and Automating Post-Deployment Actions in a Cloud Environment" and Drawings in U.S. Appl. No. 16/427,679, filed May 31, 2019, 53 pages.

* cited by examiner

PRE-DEPLOYMENT OF PARTICULAR VIRTUAL MACHINES BASED ON PERFORMANCE AND DUE TO SERVICE POPULARITY AND RESOURCE COST SCORES IN A CLOUD ENVIRONMENT

BACKGROUND

The present invention generally relates to cloud services, and more particularly, to optimizing the deployment of virtual resources and automating post-deployment actions in a cloud environment.

Cloud providers provide users with virtual resources as part of virtual machines. Users submit requests (e.g., as part of a service-level agreement (SLA)) for virtual machines having a particular configuration (e.g., minimum virtual CPU resources, memory resources, storage resources, etc.) Users can also customize each virtual image for their individual purpose at deploy time or later after being deployed. An example of such customization may be the installation of additional services or middleware. Building a virtual machine with a particular configuration takes time to deploy. The perceived deployment time for virtual machines can be a significant differentiator between cloud providers, but there are technical limitations as to how quickly a deployment can occur.

Typically, it is important for system and management stability that the user not be able to adjust their SLA (e.g., the virtual resources requested) while the virtual machine is running. Thus, it is typically critical that the user select an appropriate resource reservation at deploy time. However redeployment often occurs to adjust the amount of virtual resources for the user. For example, redeployment of a virtual machine occurs when a user initially requests too few or too many resources. This may happen since public cloud users often are motivated by pay-as-you-go cost structure to minimize resource usage and private cloud users are motivated by trying to conserve a scarce public resource.

Further, resource fragmentation can occurs when a common problem with a VM propagates across the deployment of multiple similar VMs. The fragmentation problem can occur regardless of the natural lifetime of a VM, but fragmentation is made worse when requested resources are inappropriate for the intended purpose of the VM. The stability of the entire system of a cloud provider can be compromised when a VM is redeployed with a change in resources. If fragmentation is not immediately apparent, then allocation of a limited resource can lead to fractions of the global resource bucket being distributed amongst many. When a resource fraction is returned, it may not be appropriately sized for future resource requests. For example, a returned resource may possibly be too small, and unusable for future applications. Alternatively, a returned resource may be too large, thereby leading to potentially more fragmentation when a small fraction is leftover after being used.

Memory and hard drives have partially solved this by defragmentation techniques to physically relocate used resources in a way to make the usage continuous. While defragmentation may be possible for a single resource, cloud environments include multiple resource types (e.g., minimum virtual CPU resources, memory resources, storage resources, etc.), each being a variable at deploy time. This multi-commodity problem in cloud environments can make resource fragmentation exponentially worse and can lead to severe resource underutilization and even can lead to the point of cloud instability. This instability can be reached when there are sufficient resources to deploy the requested VM, but none of those resources are available on the same physical machine.

Cloud environments, e.g., data centers, utilize IT professionals to manage their VMs. For example, IT professionals keep software up to date and protected from viruses, ensuring a VM maintains the correct user accounts, are time synchronized, performing OS and SW key management, ensuring communication services up and running, etc. With traditional data centers, adding a new server or making changes is limited to the availability of IT professionals. When moving to the cloud, the creation of new servers is simplified and resources potentially are better utilized, but many management tasks for VMs are either no longer performed or again limited by IT professional's time. For some businesses, neither is acceptable and ultimately this restricts their continued business growth.

Managed Services seeks to automate as many of these tasks as possible to reduce the number of IT professionals required. With automation, detailed records and auditing can be performed to prove a level of compliance too. Generation of these automated tasks is a laborious job and can be a one-size-fits-none situation. For example, a software package is added to all VMs, but once receiving the VM, many users then modify and/or remove the package. Updating of the automated tasks may only occur when a user notifies an IT professional or administrator of the update.

SUMMARY

In an aspect of the invention, computer-implemented method includes: monitoring, by a computing device, performance of currently deployed virtual machines (VMs) that implement particular services; determining, by the computing device, optimal configuration options for deployment of new VMs that implement one or more of the particular services based on the monitoring the performance of the currently deployed VMs; and outputting, by the computing device, information regarding the optimal configuration options to a user requesting the deployment of a new VM implementing one or more of the particular services. In a further aspect, the method includes monitoring usage activity of the currently deployed VMs, where the determining the optimal configuration options is further based on the usage activity. In a further aspect, the method further includes pre-deploying one or more VMs.

In an aspect of the invention, there is a computer program product comprising a computer readable storage medium having program instructions embodied therewith. The program instructions are executable by a computing device to cause the computing device to: store or monitor information regarding popularity of virtual machine (VM) configurations of deployed virtual machines (VMs); determine costs associated with building VMs having a particular configuration on-demand; score VM configurations based on the measure of popularity and the costs associated with building the VMs on-demand; select VM configurations with scores satisfying a threshold for pre-deployment; and store the selected VM configurations for pre-deployment. In a further aspect, the program instructions cause the computing device to provide a VM having a pre-deployed configuration to a requesting user. In a further aspect, the determining the costs includes: determining time or resources consumed when building VMs having the particular configuration on-demand; assigning weightings to the resources consumed based on the type of resources consumed; and determining the resources consumed based on the weightings.

In an aspect of the invention, a system includes: a CPU, a computer readable memory and a computer readable storage medium associated with a computing device, The system also includes: program instructions to monitor modifications made to deployed virtual machines (VM) having particular characteristics; program instructions to determine techniques used to implement the modifications; program instructions to generate or update an automated action to modify other VMs having the particular characteristics, where the automated action includes the determined techniques used to implement the modifications; and program instructions to store or update the automated action in a catalog of automated actions, wherein the automated actions in the catalog of automated actions are selectable to implement a modification to a deployed VM. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
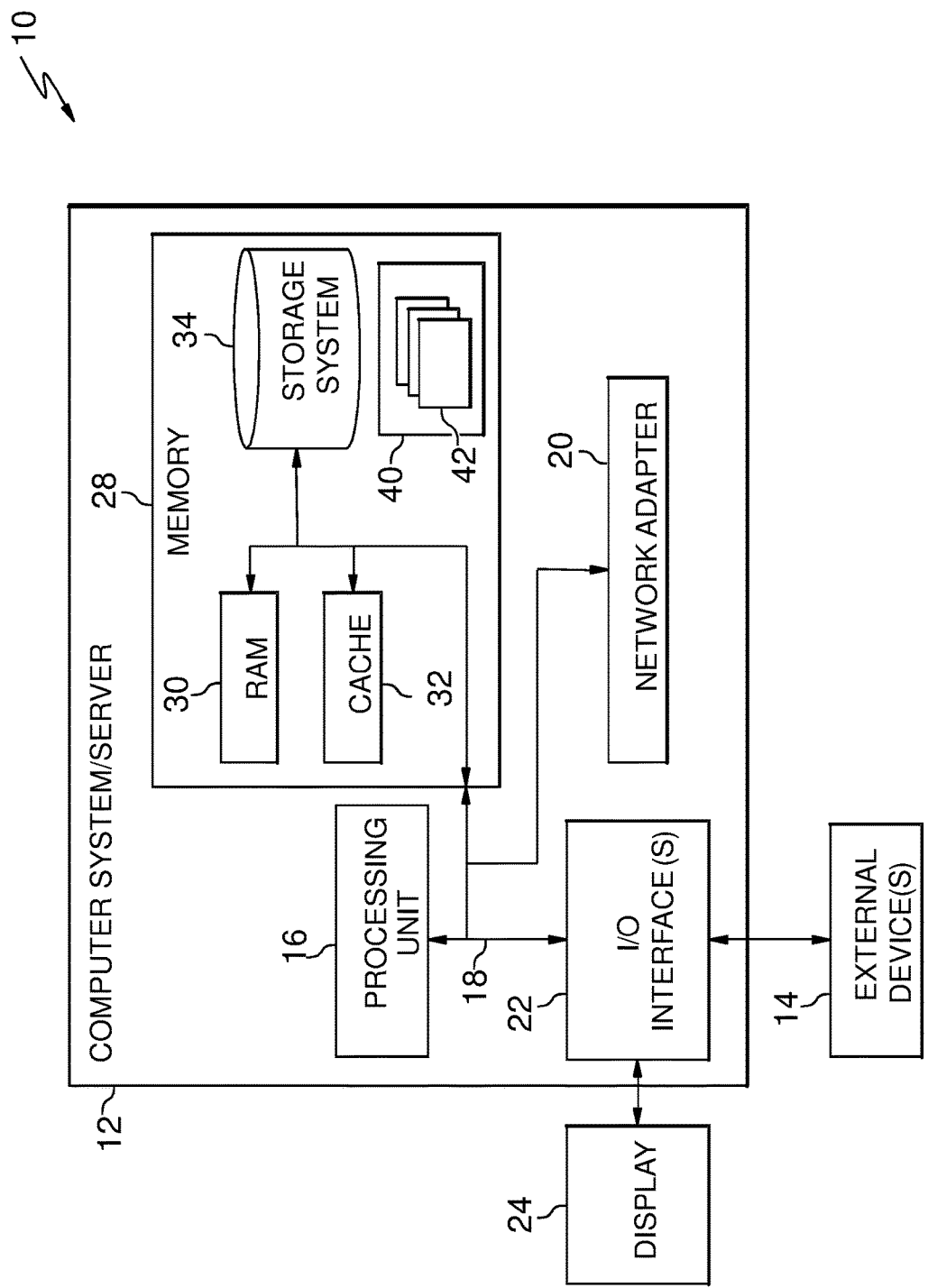
FIG. 1 depicts a cloud computing node according to an embodiment of the present invention.

The present invention generally relates to cloud services, and more particularly, to optimizing the deployment of virtual resources and automating post-deployment actions in a cloud environment. In accordance with aspects of the present invention, systems and/or methods may store information regarding virtual machine (VM) configurations (e.g., the resources provided by VMs associated with users), monitor the performance and activity (e.g., common usage patterns) of the VMs post-deployment, and periodically determine optimal configuration options for future VM deployment requests based on the performance and activity of currently deployed VMs. In additional and/or alternative aspects of the present invention, the systems and/or methods may pre-deploy VMs to reduce the amount of time and/or cost associated with serving a VM to a user. Aspects of the present invention may assist users in selecting appropriate resource allocations at deployment, thereby saving the user time in redeployments and reconfigurations. For example, users can potentially save money by having appropriately sized VMs (e.g., VMs with an appropriate amount of resources) without paying for more resources needed.

Aspects of the present invention may identify a source of a performance problem in VMs, rather than identifying merely the symptoms of a problem. Configurations can be suggested so that performance problems in a deployed VM can be avoided, thereby reducing the number of redeployments. This can help reduce the redeployment effort, and reduce resource the costs and efforts associated with resource fragmentation caused by reemployment of VMs. In alternative embodiments, aspects of the present invention may also auto-generate automated tasks and dynamically adjust the automated task options available to users over time as the activity of VMs change.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
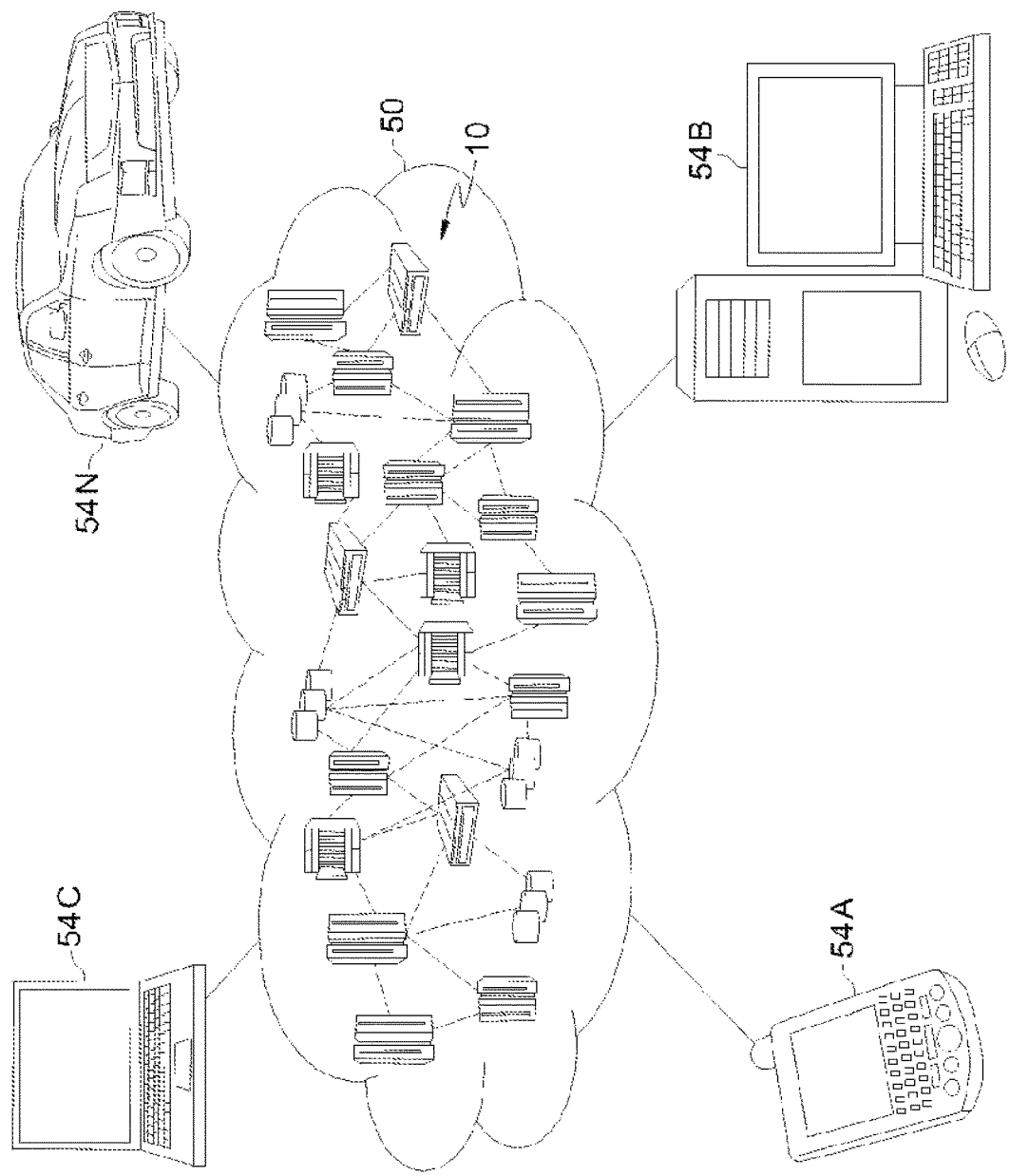
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
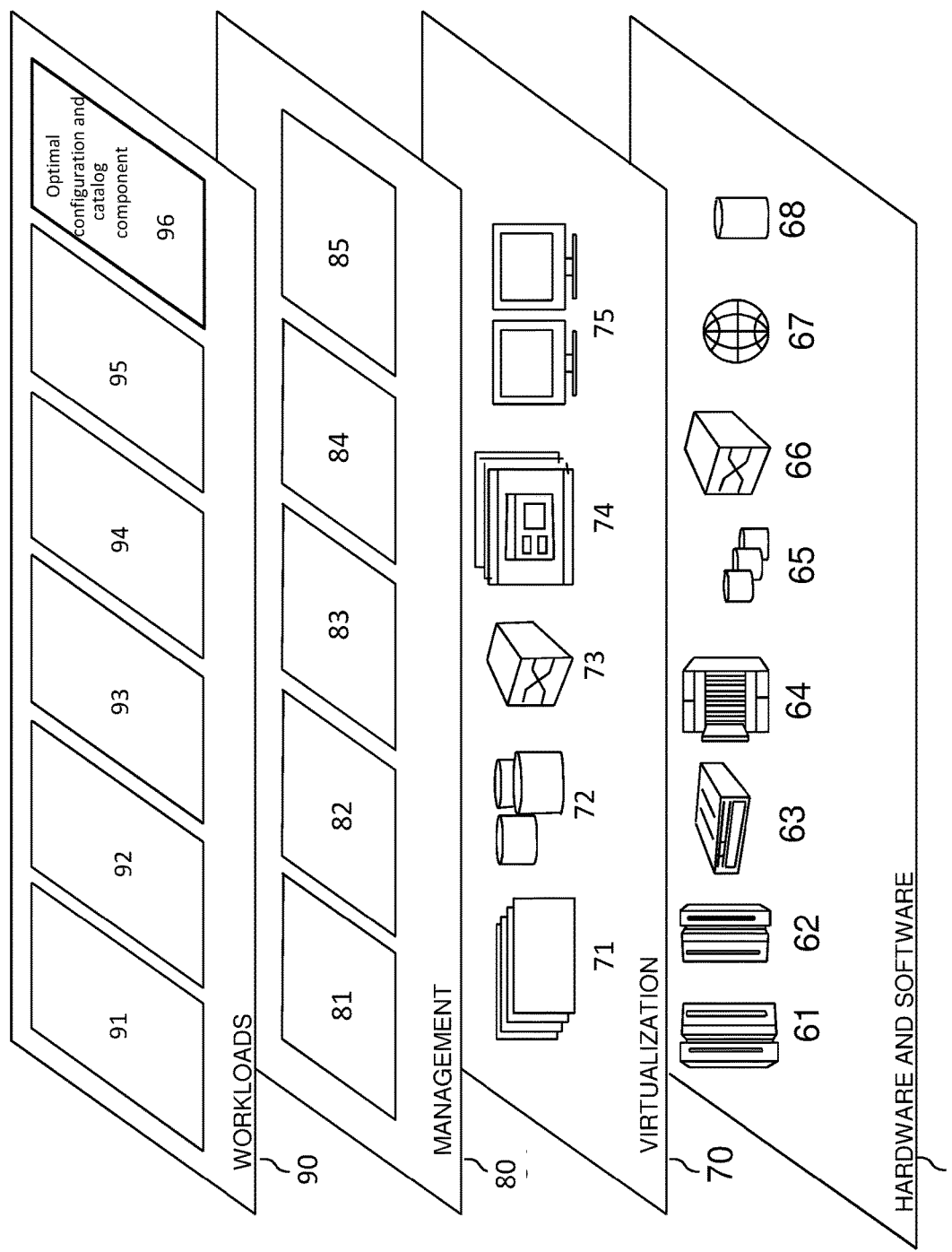
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimal configuration and catalog component 96.

Referring back to FIG. 1, the Program/utility 40 may include one or more program modules 42 that generally carry out the functions and/or methodologies of embodiments of the invention as described herein. Specifically, the program modules 42 may monitor the performance and activity of the VMs post-deployment, and periodically computer and determine the optimal configurations for future VMs based on the performance and activity of deployed VMs. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an optimal configuration and catalog component 96.

Figure 4:
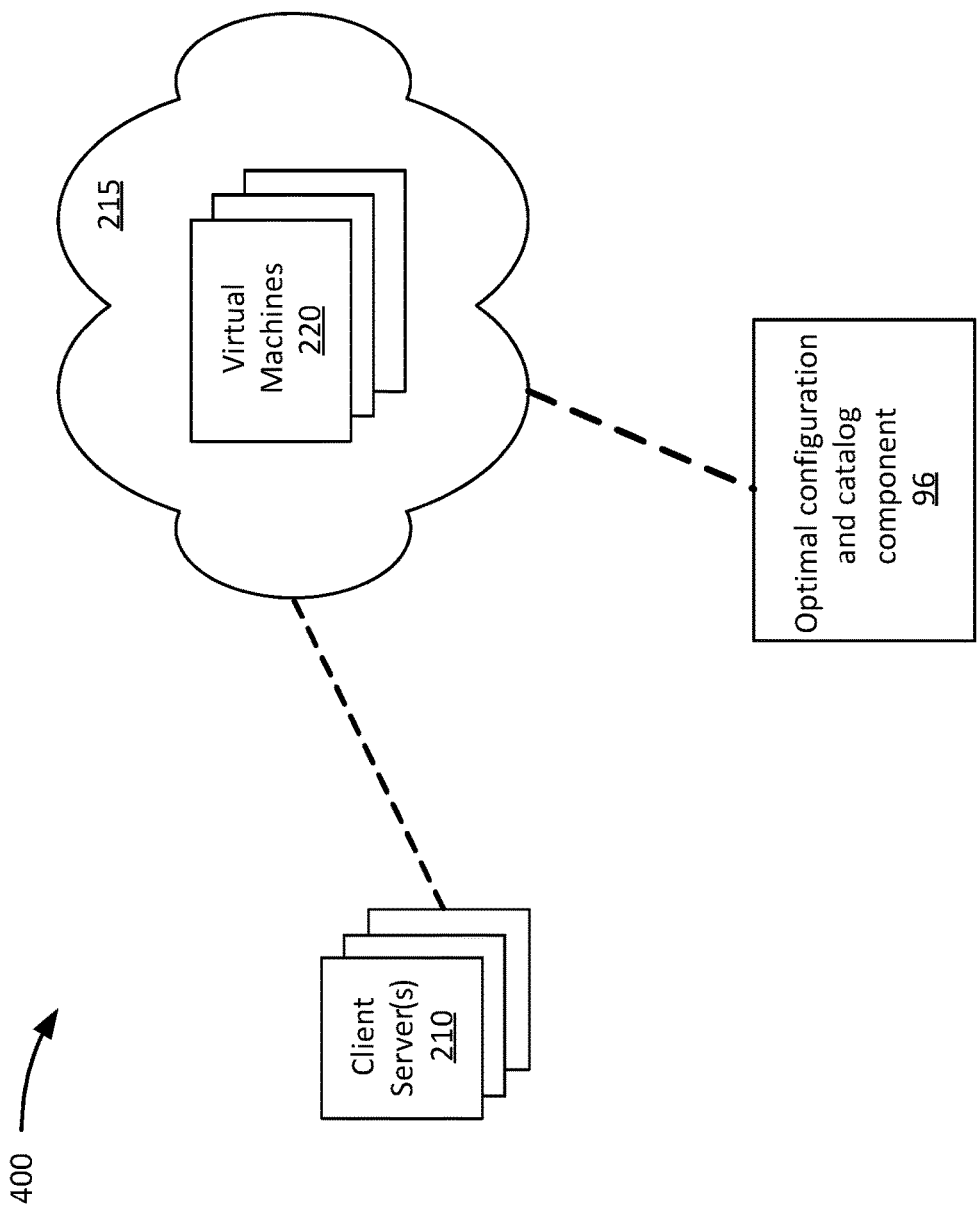
FIG. 4 shows an example environment in accordance with aspects of the present invention.

FIG. 4 shows an overview of an example environment in accordance with aspects of the present invention. As shown in FIG. 4, environment 400 may include client servers 210, a cloud provider network 215, virtual machines 220, and an optimal configuration and catalog component 96.

The client servers 210 may include computing devices associated with users that access the cloud provider network 215 for cloud services. The client servers 210 may implement any number or type of application, and may request virtual resources provided by one or more virtual machines 220 implemented as part of the cloud provider network 215. Each client server 210 may be associated with a service level agreement (SLA) that defines the configuration for a VM owned by the user of the client server 210. For example, the configuration may identify the resources provided the VM, the types of applications supported by VM should, and/or other specifications relating to the VM.

The cloud provider network 215 may include network nodes, such as network nodes 10 of FIG. 2. Additionally, or alternatively, the cloud provider network 215 may include one or more wired and/or wireless networks. For example, the cloud provider network 215 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the cloud provider network 215 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The cloud provider network 215 may implement one or more virtual machines 220 across its network. Each virtual machine 220 may host one or more virtual images for use by the client servers 210. In embodiments, the client servers 210 may access virtual resources provided by the virtual machines 220. One or more physical server or computing devices within the cloud provider network 215 may host one or more virtual machines 220.

The optimal configuration and catalog component 96 may include one or more computing devices that may store information regarding VM configurations (e.g., the resources provided by VMs for each user or each client server 210), monitor the performance and activity of the VMs post-deployment, and periodically computer and determine the optimal configurations for future VMs based on the performance and activity of deployed VMs. The optimal configuration and catalog component 96 may periodically determine optimal VM configurations for future VM deployments based on the historical performance and activity of currently deployed VMs. The deployment of optimal VM configurations may reduce the number of VM redeployments, thereby reducing costs and resource fragmentation. In embodiments, the optimal configuration and catalog component 96 may pre-deploy VMs by storing images of pre-deployed VMs so that these VMs do not need to be built from scratch, thereby saving time in the deployment (or redeployment) of new VMs to users.

In alternative embodiments, the optimal configuration and catalog component 96 may monitor the modification of VMs post-deployment, determine scripts/techniques used to implement the modifications, generate or update automated actions to automate modifications that are routinely performed, and store the automated actions in a catalog for use by administrators.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

Figure 5:
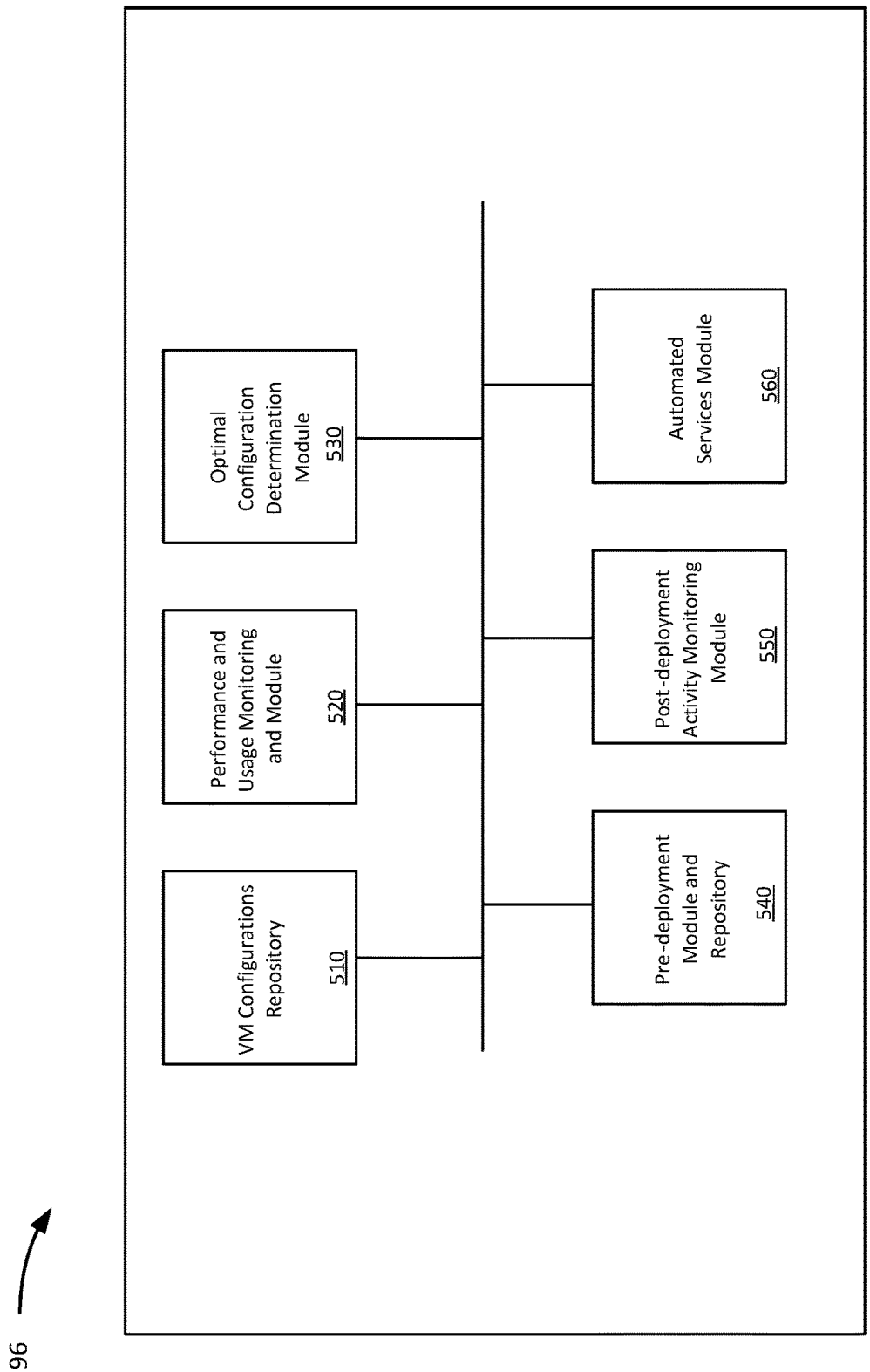
FIG. 5 shows a block diagram of example components of an optimal configuration and catalog component in accordance with aspects of the present invention.

FIG. 5 shows a block diagram of example components of an optimal configuration and catalog component 96 in accordance with aspects of the present invention. As shown in FIG. 5, the optimal configuration and catalog component 96 may include a VM configurations repository 510, a performance and usage monitoring module 520, an optimal configuration determination module 530, a pre-deployment module and repository 540, a post-deployment activity monitoring module 550, and automated services module 560. In embodiments, the optimal configuration and catalog component 96 may include additional or fewer components than those shown in FIG. 5. In embodiments, one or more of the components in FIG. 5 may correspond to program module 42 of FIG. 1. In embodiments, separate components may be integrated into a single computing component or module. Additionally, or alternatively, a single component may be implemented as multiple computing components or modules.

The VM configurations repository 510 may include a data storage device (e.g., storage system 34 of FIG. 1) that stores information regarding the configurations of VMs currently deployed to users. For example, the VM configurations repository 510 may store metadata or information regarding the configuration, characteristics, or attributes of the VMs. Examples of the information regarding the configuration, characteristics, or attributes of a VM may include:

Base VM (e.g., a type of pre-configured VM upon which the VM is built).
The type of services implemented or supported by the VM.
Current resources allocated or provided by the VM.
Current resources utilized by the user of the VM.
Historical utilization peaks and valleys.

The configuration data for a VM may be stored by the VM configurations repository 510 when the VM is built and/or deployed to a user, and may be updated over a period time as the VM is used by the user.

The performance and usage monitoring module 520 may include a program module (e.g., a program module 42 of FIG. 1) that monitors the performance and usage of post-deployment (e.g., currently active) VMs. The performance and usage monitoring module 520 may perform periodic health-checks on VMs, identify VMs that are re-deployed, and the configurations of re-deployed VMs. Also, the performance and usage monitoring module 520 may monitor the usage of VMs, and map the usage information to the configuration of the VMs. Information regarding the performance and usage patterns of VMs may be used to determine optimal configuration options for future VM deployment requests.

The optimal configuration determination module 530 may include a program module (e.g., a program module 42 of FIG. 1) that determines optimal configuration options for future VM deployment requests. In embodiments, the optimal configuration determination module 530 may determine the optimal configuration options based on the characteristics of VMs (stored by the VM configurations repository 510), and the performance and usage patterns determined by the performance and usage monitoring module 520. As described herein, VMs with "optimal configuration" may reduce the number of VM redeployments, thereby improving cloud system performance and fragmentation.

In embodiments, the optimal configuration determination module 530 may use search space dimensionality reduction and/or statistical techniques, such as regression analysis, to estimate the relationship between different variables (e.g., characteristics or attributes of different VMs). Using such techniques, for example, particular characteristics of the VMs (as identified and stored in the VM configurations repository 510), may be isolated based on their impact on other characteristics (e.g., performance). When a characteristic in the current dataset has limited impact on performance, then that characteristic can be removed from the current consideration, hence reducing the dimensionality of the search space. Impact levels may be a tuning parameter (either fixed or dynamic) in order to arrive at a desired target granularity of the search space.

Once the dimensionality of the search space has been reduced to a desired level, the optimal configuration determination module 530 may identify or down select configuration candidates (e.g., possible configuration options for future VM deployments). The optimal configuration determination module 530 may group currently deployed VMs based on their characteristics/attributes (e.g., VMs that offer similar services). In embodiments, the optimal configuration determination module 530 may discard those groups of VMs, from consideration of possible configuration options that have a level of popularity less than a particular threshold. In embodiments, the optimal configuration determination module 530 may identify optimal configuration candidates based on:

- A threshold number of VMs with a particular configuration or in a particular group.
- A tiered threshold in which, for example, a particular configuration is automatically selected as a candidate optimal configuration when a threshold number of VMs with that particular configuration are currently deployed, and another configuration is selected as a potential candidate optimal configuration when a smaller threshold number of VMs with that configuration are currently deployed. The potential candidate optimal configuration may later be selected as a candidate after passing performance tests. This provides the opportunity for certain configurations with growing popularity to potentially be selected as a candidate optimal configuration.
- A purer statistical approach using a stream of configuration updates to drive a Markov model of the system, hence with system defined probabilities, candidates may be promoted or demoted over time.

In embodiments, the optimal configuration determination module 530 may further down select the optimal configuration candidates and identify optimal configuration options for future VM deployments based on:

- Serially testing each VM in a group of VMs having similar characteristics for performance to determine one or more optimal resource configurations for the VM.
- Determining that a VM configuration satisfies performance thresholds and performs for the users as desired.
- Determining that a VM configuration satisfies cloud management metrics with an emphasis on creating commonly sized sets of VM resources such that several VMs with different characteristics may use the same base set of resources. Common resource sizes may help prevent resource fragmentation within the cloud infrastructure, simplify management and deploy, and may be used to pre-deploy VMs with particular configurations.
- Evaluating each VM's historical performance, exclude those configurations that resulted in unacceptable performance levels, and of those configurations that remain, prioritize those configurations that are similar to other optimal resource configurations. The resulting optimal choice may be a resource configuration that may have been previously known to, or a new configuration not previously known or available.
- Testing each VM by deploying a new one to test performance against a mock workload, and retaining the configurations that satisfy a performance measurement threshold.
- Using neural networks, Monte Carlo simulations, and/or other similar statistical packages to test known VM configurations and/or to input multiple configurations simultaneously such that the configurations each would be a decision option, hence resulting in a framework that may result in an identifying optimal configuration not previously identified.

In embodiments, the optimal configuration determination module 530 may present optimal configuration options to a user requesting the deployment of a new VM. For example, the optimal configuration determination module 530 may receive a selection, from a user, for a base VM and a set of services that the user desires to utilize using the VM. The optimal configuration determination module 530 may then present optimal configuration options for the user based on the selected base VM and the set of services. For example, the optimal configuration determination module 530 may present the optimal configuration options identified as described above. In embodiments, the optimal configuration determination module 530 may present the configuration options along with respective performance statistics of VMs having similar configurations. In embodiments, the user may select a one of the optimal configuration options, or may have the freedom to select a different or customized configuration. As described herein, the selection of an optimal configuration option may reduce the probability of redeployment of the VM, thereby improving the performance of a cloud system and reducing fragmentation.

The pre-deployment module and repository 540 may include a program module and/or a storage system (e.g., a program module 42 and/or a storage system 34 of FIG. 1) that may "pre-deploy" VMs having particular characteristics and particular configurations. In embodiments, the pre-deployment module and repository 540 may pre-deploy a VM by storing the VM so that the pre-deployed VM can be provided to a requesting user in a relatively and substantially shorter amount of time than a VM that would need to be built from scratch. In embodiments, the pre-deployment module and repository 540 may select candidate configurations for pre-deployment. In embodiments, the candidate configurations for pre-deployment may be optimal configurations (e.g., as identified by the optimal configuration determination module 530 as described above). However, since pre-deployment of VMs consumes resources, not all optimal configurations may be pre-deployed, as pre-deploying certain VM configurations may be more costly in relation to the benefit. Also, certain configurations that are not considered "optimal" configurations may be selected as candidate configurations. In embodiments, the pre-deployment module and repository 540 may determine the candidate configurations for pre-deployment, and may further select configurations for pre-deployment based on, for example:

- Popularity (e.g., the number of VMs having a particular configuration).
- On-demand deployment time (e.g., the amount of time needed to build a VM from scratch).
- Resource cost (e.g., the amount of resources and/or the value of the resources used to store a pre-deployed configuration), etc.

As an example, a relatively popular configuration would be more likely to be pre-deployed than an unpopular configuration. Similarly, a configuration with a relatively long on-demand deployment time would be more likely to be pre-deployed than a configuration with a relatively short on-demand deployment time. Similarly, a configuration with a relatively low resource cost would be more likely to be pre-deployed than a configuration with a relatively low resource cost. In embodiments, the pre-deployment module and repository 540 may determine the resources consumed (i.e., the resource cost) by assigning weightings to the resources consumed based on the types of resources. For example, CPU resources may be weighted differently than disk space resources. In embodiments, the pre-deployment module and repository 540 may score the candidate configurations for pre-deployment based on one or more of the above factors, and may select configurations that exceed a particular score. In alternative embodiments, the pre-deployment module and repository 540 may identify commonalities between a set of configurations (e.g., by sorting the configurations by base VM and by most popular service). The pre-deployment module and repository 540 may identify the smallest significantly large group to form VM bases having services that are relatively common among a set of VMs.

In embodiments, the pre-deployment module and repository 540 may determine a quantity of copies of each configuration to pre-deploy (e.g., based on the available resources, the popularity/importance of the resources, and the quantity of copies that a configuration has been pre-deployed to users). As an example, if the quantity of VMs with a particular configuration to be deployed is anticipated or know to be fewer than the quantity of configurations that are pre-deployed (e.g., stored), then those copies of the pre-deployed configurations may be removed to reclaim the resources used to pre-deploy the configurations. If the quantity of VMs with a particular configuration to be deployed is anticipated or know to be greater than the quantity of configurations that are pre-deployed (e.g., stored), then additional configurations are pre-deployed. In embodiments, the pre-deployment module and repository 540 may pre-deploy configurations with the most popular services.

The post-deployment activity monitoring module 550 may include a program module (e.g., a program module 42 of FIG. 1) that may monitor the activity of post-deployment VMs (e.g., VMs currently in use). As described herein, information regarding the activity of the post-deployment VMs may be used to generate a catalog of automated services that are available to users of VMs, and dynamically adjust the automated services as the activity of VMs changes. In embodiments, the post-deployment activity monitoring module 550 may monitor activity, such as modifications made to VMs (e.g., applications/services added or removed, user IDs created or removed, performing time synchronization, etc.), and monitoring the steps involved in implementing the modifications (e.g., monitoring scripts, cookbooks, installers, rich site summary (RSS) feeds, etc. used to implement the modifications). In embodiments, monitored activity may include a command on a command line interface, a mouse click, a voice command, and/or any other action that results in a modification to a VM. In embodiments, the post-deployment activity monitoring module 550 may store VM information when a modification is detected (e.g., memory, CPUs, data storage information, etc.).

In embodiments, the post-deployment activity monitoring module 550 may access external databases as part of monitoring the activity on a VM, thereby effectively "crowd sourcing" information identifying the usage of a VM. For example, the post-deployment activity monitoring module 550 may access both public and private sources, such as blogs, social media, developer communities for cookbooks, etc. Also, the post-deployment activity monitoring module 550 may access information provided by vendors of software included in the VMs.

The automated services module 560 may include a program module (e.g., a program module 42 of FIG. 1) that generates a catalog of automated services that administrators or users may select to perform automated tasks. The automated services module 560 may generate the automated tasks based on the monitored activity of VMs, as determined by the post-deployment activity monitoring module 550. In embodiments, the activity of users may be non-linear in progression. The automated services module 560 may analyze certain actions/activity for relevance to prior actions, and create links/paths between the different actions. Unrelated action paths may be separated or disconnected. Action paths that are determined to be related to existing services can be marked. Similarly, paths with an unknown relationship can also be marked. Path lengths may be limited to keep further actions tractable.

In embodiments, the automated services module 560 may group monitored actions based on similar services such that actions may be analyzed and tagged with fields (e.g., applications used, commands performed, etc.). Actions are analyzed for their similarities and differences, and grouped based on similarities, and different actions may be used in unique configurations based on target VMs.

In embodiments, the automated services module 560 may generate automated tasks based on monitored actions. In embodiments, the automated services module 560 may generate automated tasks based on a threshold number of modifications made across a group of VMs. For example, if a particular software is installed greater than a threshold number of times, the automated services module 560 may generate an automated task to install this software, and store the automated task in a catalog of automated tasks.

In embodiments, the automated services module 560 may test the automated tasks to ensure that the automated tasks result in a desired outcome. For example, if a desired outcome was the installation of an anti-virus, and the test result indicates that no anti-virus is running, then the automated services module 560 may determine that the automated task did not result in a desired outcome, and the automated task me be discarded or modified. More complex testing may require that a service be installed within a specified time window or result in a certain level of performance. In embodiments, an administrator may review and/or manually test an automated task prior to release. From the catalog of automated tasks, an administrator may select an automated task to automate the modification of VMs that are routinely manually performed (e.g., as determined by activity monitoring by the post-deployment activity monitoring module 550). Also, the catalog of automated tasks is dynamically updated based on updated monitoring of VM usage activity.

Figure 6:
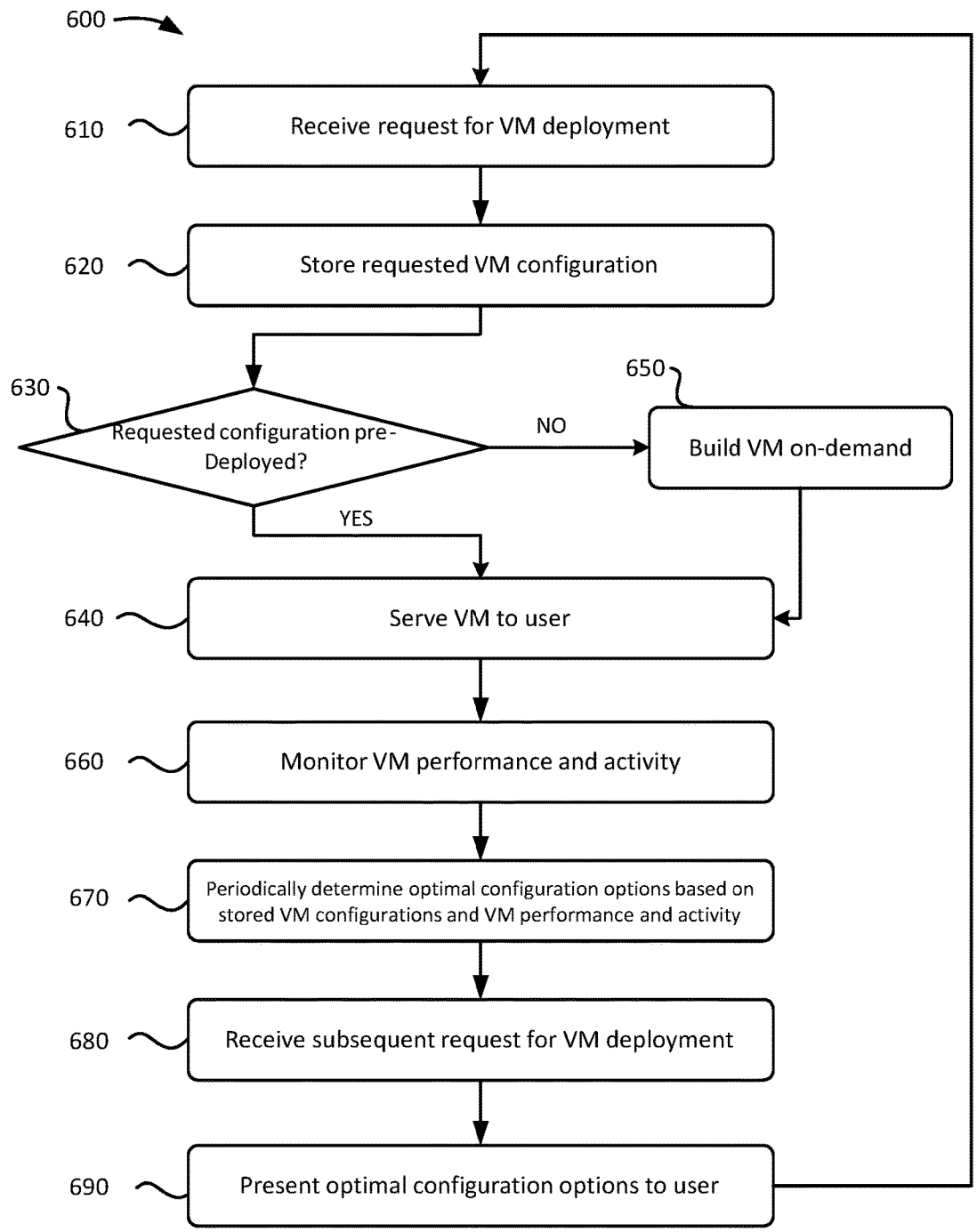
FIG. 6 shows an example flowchart for presenting optimal configuration options to a requesting user of a new VM deployment in accordance with aspects of the present invention.

FIG. 6 shows an example flowchart for presenting optimal configuration options to a requesting user of a new VM deployment. The steps of FIG. 6 may be implemented in the environment of FIGS. 1-5, for example, and are described using reference numbers of elements depicted in FIGS. 1-5. As noted above, the flowchart illustrates the architecture, functionality, and operation of possible implementations of systems, methods, and computer program products according to various embodiments of the present invention.

As shown in FIG. 6, process 600 may include receiving request for VM deployment (step 610). For example, the optimal configuration and catalog component 96 may receive the request for a new VM deployment from a user of a client server 210. In embodiments, the request may identify the characteristics and/or configuration of the requested VM (e.g., the base VM, resources, services/applications, etc.).

Process 600 may also include storing the requested VM configuration (step 620). For example, the optimal configuration and catalog component 96 may store the configuration for the requested VM (e.g., in the VM configurations repository 510). The requested configuration may be added to a database of VM configurations of deployed VMs.

Process 600 may further include determining whether the requested configuration is pre-deployed (step 630). For example, the optimal configuration and catalog component 96 may search within the post-deployment activity monitoring module 550 to determine whether the requested configuration is pre-deployed (e.g., by comparing the characteristics of the requested configuration with the characteristics of pre-deployed configurations). If, for example, the requested configuration is pre-deployed (step 630—YES), then at step 640, process 600 may include serving the VM to the user (e.g., providing access to the VM by the client server 210 associated with the user). If, on the other hand, the requested configuration is not pre-deployed (step 630—NO), process 600 may include building the VM on-demand (step 650). For example, the optimal configuration and catalog component 96 may build the VM from scratch in accordance with the requested configuration. Process 600 may then proceed to step 640, as described above.

Process 600 may also include monitoring the performance and activity of the VM (step 660). For example, the optimal configuration and catalog component 96 may monitor the performance and the activity of the VM (e.g., as described above with respect to the performance and usage monitoring module 520).

Process 600 may further include periodically determining optimal configuration options based on the stored VM configurations and the VM performance and activity information (step 670). For example, the optimal configuration and catalog component 96 may periodically determining optimal configuration options based on the stored VM configurations and the VM performance and activity information (e.g., as described above with respect to the optimal configuration determination module 530).

Process 600 may also include receiving a subsequent request for a VM deployment (step 680). For example, the optimal configuration and catalog component 96 may receive a subsequent request for a VM deployment including a requested configuration of the VM.

Process 600 may further include presenting optimal configuration options to the user (step 690). For example, the optimal configuration and catalog component 96 may present optimal configuration options to the user (e.g., as described above with respect to the optimal configuration determination module 530). In embodiments, the optimal configuration options may include those configurations that have historically performed above a performance measurement threshold and have similar characteristics/services as the services requested by the user at step 680. Process 600 may return to step 610 after the optimal configuration options have been presented. For example, at step 610, the user may select one of the optimal configuration options, which may reduce the probability that the VM would need to be re-deployed. As described above, the user may select a different configuration than the optimal configuration, if desired.

Figure 7:
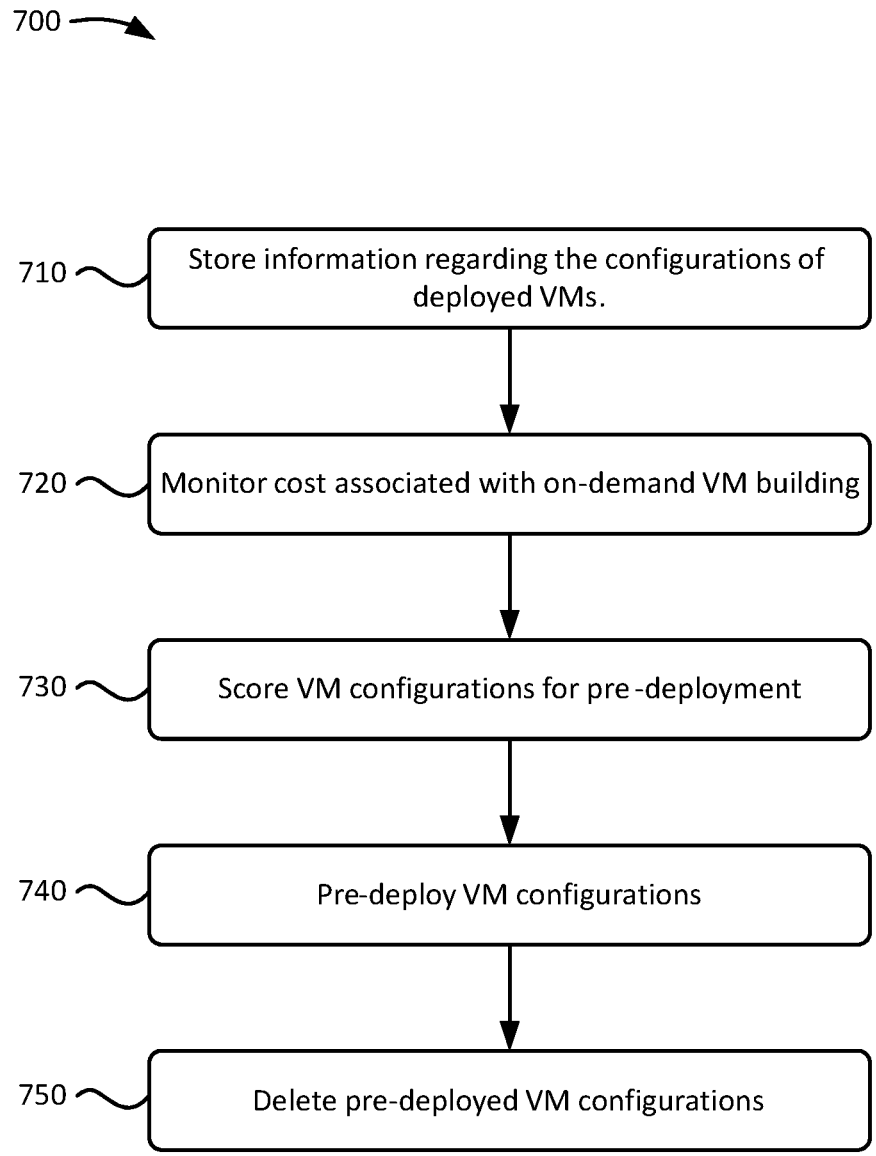
FIG. 7 shows an example flowchart for pre-deploying VMs with particular configurations in accordance with aspects of the present invention.

FIG. 7 shows an example flowchart for pre-deploying VMs with particular configurations. The steps of FIG. 7 may be implemented in the environment of FIGS. 1-5, for example, and are described using reference numbers of elements depicted in FIGS. 1-5. As noted above, the flowchart illustrates the architecture, functionality, and operation of possible implementations of systems, methods, and computer program products according to various embodiments of the present invention.

As shown in FIG. 7, process 700 may include storing information regarding the configurations of deployed VMs (step 710). For example, the optimal configuration and catalog component 96 may store and/or monitor information regarding the configurations of deployed VMs (e.g., to select candidate configurations for pre-deployment based on popularity as described above with respect to the pre-deployment module and repository 540).

Process 700 may further include monitoring the cost associated with on-demand VM building (step 720). For example, the optimal configuration and catalog component 96 may monitor the costs associated with building a VM, having a particular configuration, from scratch. In embodiments, the optimal configuration and catalog component 96 may monitor the amount of time and/or computing resources needed to build the VM from scratch. Information regarding the cost may be used to determine whether a VM of a particular configuration should be pre-deployed.

Process 700 may also include scoring VM configurations for pre-deployment (step 730). For example, the optimal configuration and catalog component 96 may score candidate VM configurations for pre-deployment based on the popularity of the VMs, the cost of pre-deploying the VMs, the cost associated with building the VMs, on demand, etc. In embodiments, the optimal configuration and catalog component 96 may score candidate VM configurations as described above with respect to the pre-deployment module and repository 540.

Process 700 may further include pre-deploying VM configurations (step 740). For example, the optimal configuration and catalog component 96 may pre-deploy or store VM configurations whose score satisfies a particular threshold. In embodiments, the optimal configuration and catalog component 96 may pre-deploy or store VM configurations as described above with respect to the pre-deployment module and repository 540.

Process 700 may also include deleting pre-deployed VM configurations (step 750). For example, the optimal configuration and catalog component 96 may periodically delete pre-deployed VM configurations that are no longer popular (e.g., VM configurations whose measure of popularity or number of deployments falls below a particular threshold). In embodiments, the optimal configuration and catalog component 96 may delete pre-deployed VM configurations as described above with respect to the pre-deployment module and repository 540.

Figure 8:
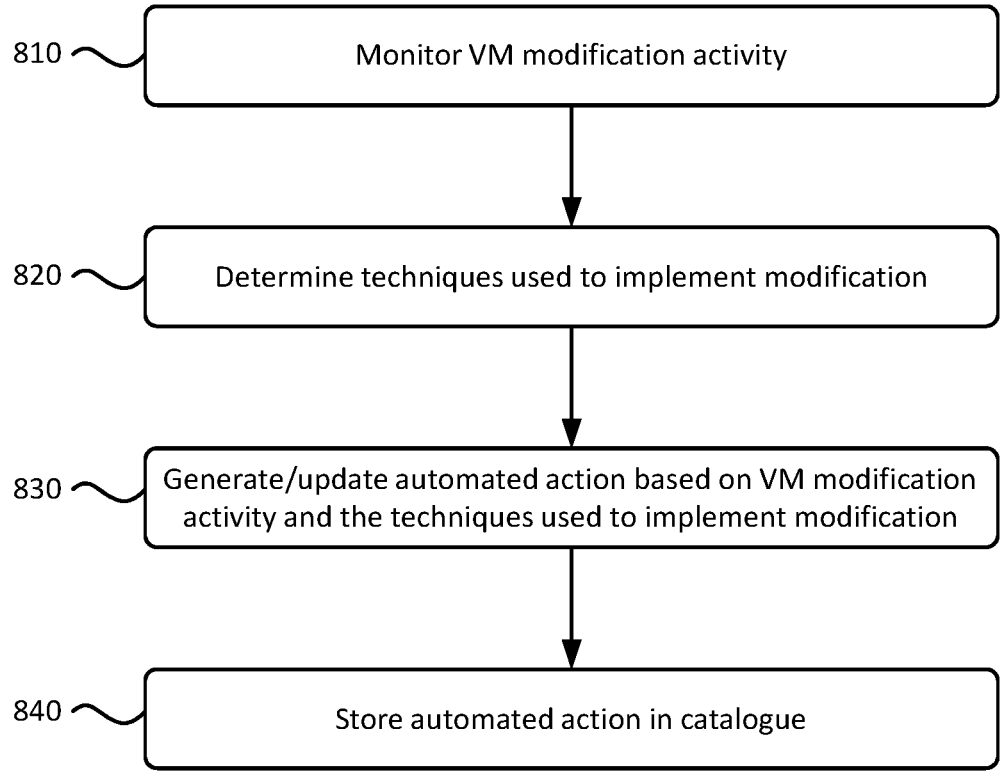
FIG. 8 shows an example flowchart for pre-deploying VMs with particular configurations in accordance with aspects of the present invention.

FIG. 8 shows an example flowchart for pre-deploying VMs with particular configurations. The steps of FIG. 8 may be implemented in the environment of FIGS. 1-5, for example, and are described using reference numbers of elements depicted in FIGS. 1-5. As noted above, the flowchart illustrates the architecture, functionality, and operation of possible implementations of systems, methods, and computer program products according to various embodiments of the present invention.

As shown in FIG. 8, process 800 may include monitoring VM modification activity (step 810). For example, the optimal configuration and catalog component 96 may monitor the VM modification activity as described above with respect to the post-deployment activity monitoring module 550.

Process 800 may also include determining techniques used to implement modifications (step 820). For example, the optimal configuration and catalog component 96 may determine techniques used to implement modifications as described above with respect to the post-deployment activity monitoring module 550. In embodiments, the optimal configuration and catalog component 96 may determine techniques used to implement modifications when a modification has been made greater than a threshold number of times (e.g., when a the optimal configuration and catalog component 96 has identified modifications to a software package across deployed VMs greater than a threshold number of times). In embodiments, the techniques used to implement the modifications may be reviewed by an administrator to validate the techniques. Additionally, or alternatively, the optimal configuration and catalog component 96 may indicate to the administrator that no techniques to implement the modifications were found.

Process 800 may further include generating or updating an automated action based on the VM modification activity and the techniques used to implement the modification (step 830). For example, the optimal configuration and catalog component 96 may generate or update an automated action based on the VM modification activity and the techniques used to implement the modification as described above with respect to the automated services module 560.

Process 800 may also include storing an automated action in a catalog (step 840). For example, the optimal configuration and catalog component 96 may store a newly generated automated action (or an update to an existing automated action) in a catalog. In embodiments, the optimal configuration and catalog component 96 may store an automated action in a catalog described above with respect to the automated services module 560.

In embodiments, an administrator may write automation for installation of any new services or modifications, or may simply review existing automation techniques generated at step 830. In embodiments, automated actions may be removed (e.g., when the automated actions are no longer used). An administrator may also be notified if the removal of an automated action has reached a threshold number of VMs, and if the automated action should be removed from the catalog altogether. Approval of removal of automated actions from the catalog may also be automated.

In embodiments, the optimal configuration and catalog component 96 may self-provision automated actions into particular VMs having particular configurations. The optimal configuration and catalog component 96 may provision multiple incarnations that modify items, such as CPU, memory, etc. to adjust/improve performance based on benchmark test runs. In embodiments, an automated action may be verified or tested by an administrator to check whether the automated action completed successfully and/or whether installation of desired services completes successfully. Also, performance of a VM after implementing an automated action may be tested, and if the results satisfy a performance threshold or performance metrics (e.g., no thrashing, uptime reliable, and/or other performance metrics) the automated action may be added to the catalog of available automated actions. In embodiments, an automated action may be added to the catalog after a threshold number of VM's adding or removing a service/software has been reached. Thus over time, automated actions can be used to ensure the most up-to-date software/services are installed on a VM.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deployment of new virtual machines (VMs) in a computing environment comprising a plurality of currently deployed VMs, comprising:

monitoring, by a computing device, performance of the plurality of currently deployed (VMs), wherein each VM of the plurality of currently deployed VMs implements one or more particular services;

determining, based on the monitoring of the performance by the computing device, one or more optimal configuration options for the deployment of new VMs, in a same computing environment as the currently deployed VMS, wherein the determining of the one or more optimal configurations comprises identifying one or more of the plurality of currently deployed VMs, that satisfy a performance threshold, wherein the one or more optimal configuration options are configurations of the one or more of the plurality of currently deployed VMs;

scoring, by the computing device, the one or more optimal configuration options to yield a score, the score based on a popularity of the one or more particular services implemented by each of the one or more of the plurality of currently deployed VMs, and the score further based on a cost associated with resources consumed by each of the one or more of the Plurality of currently deployed VMs;

pre-deploying one or more new VMs having the determined optimal configurations that have scores satisfying a threshold, wherein the pre-deploying comprises storing the optimal configurations of the one or more new VMs into a catalog;

outputting, by the computing device, information regarding the one or more optimal configuration options to a user requesting the deployment of a new VM of the one or more new VMs implementing one or more of the particular services; and deploying a particular new VM of the one or more new VMs in response to the user selecting a particular optimal configuration option corresponding to the particular new VM wherein the one or more new VMs have the stored optimal configurations.

2. The method of claim 1, further comprising monitoring usage activity of the plurality of currently deployed VMs, wherein the determining the one or more optimal configuration options is further based on the usage activity.

3. The method of claim 1, further comprising:
receiving an instruction to deploy the new VM of the one or more new VMs based on outputting the information regarding the one or more optimal configuration options;
determining that the new VM of the one or more new VMs has been pre-deployed; and
serving the new VM of the one or more new VMs based on the determining.

4. The method claim 3, wherein the instruction to deploy the new VM of the one or more new VMs includes an instruction to deploy the new VM of the one or more new VMs in accordance with one of the one or more optimal configuration options.

5. The method of claim 1, further comprising serving the pre-deployed one or more new VMs to the user.

6. The method of claim 1, wherein the determining the one or more optimal configuration options is based on receiving a request for deployment of the new VM of the one or more new VMs, wherein the request includes a base VM and one or more requested services.

7. The method of claim 1, wherein the one or more optimal configuration options reduce a probability that the new VM of the one or more new VMs is re-deployed with a different configuration.

8. The method of claim 1, wherein a service provider at least one of creates, maintains, deploys and supports the computing device.

9. The method of claim 1, wherein steps of claim 1 are provided by a service provider on a subscription, advertising, and/or fee basis.

10. The method of claim 1, wherein the computing device includes software provided as a service in a cloud environment.

11. The method of claim 1, further comprising deploying a system for providing configuration options for deployment of VMs to reduce VM redeployments, the system further comprising providing a computer infrastructure operable to perform the steps of claim 1.

12. The method of claim 1, wherein the scores are weighted based on types of the computer resources.

13. The method of claim 12, wherein the pre-deploying includes determining a quantity of copies of each of the one or more new VMs to pre-deploy.

14. A computer program product for deployment of new virtual machines (VMs) in a computing environment comprising a plurality of currently deployed VMs each implementing one or more particular services, comprising a computer readable storage medium having program instructions embodied therewith, the program instructions executable by a computing device to cause the computing device to:

monitoring performance of the plurality of currently deployed VM configurations;
determine one or more optimal configuration options for the deployment of new VMs, in a same computing environment as the deployed VMs, based on the monitored performance of the plurality of currently deployed VMs, wherein the determining of the one or more optimal configurations comprises identifying one or more of the plurality of currently deployed VMs that satisfy a performance threshold, wherein the one or more optimal configuration options are configurations of the one or more of the plurality of currently deployed VMs;
score the one or more optimal configurations to yield a score, the score based on a popularity of the one or more particular services implemented by each of the one or more of the plurality of currently deployed VMs, and the score further based on a cost associated with resources consumed by each of the one or more of the plurality of currently deployed VMs;
pre-deploy one or more new VMs having the determined optimal configuration options that have scores satisfying a threshold, wherein the pre-deploying comprises storing the optimal configuration options of the one or more new VMs into a catalog;
output information regarding the one or more optimal configuration options to a user requesting the deployment of a new VM of the one or more new VMs implementing one or more of the particular services; and
deploy a particular new VM of the one or more new VMs in response to the user selecting a particular optimal configuration option corresponding to the particular new VM, wherein the one or more new VMs have the stored optimal configurations.

15. The computer program product of claim 14, wherein the program instructions further cause the computing device to provide the pre-deployed one or more new VMs to the user.

16. The computer program product of claim 14, wherein determining the costs associated with resources consumed includes eliminating factors that do not impact the costs.

17. The computer program product of claim 14, wherein the program instructions further cause the computing device to: periodically update the scores of the one or more optimal configurations based on changes to the popularity or the costs; and remove one or more new VMs from pre-deployment that have scores that are below a particular threshold.

18. The computer program product of claim 14, wherein the scoring includes applying weightings based on the types of computer resources.

* * * * *